Nov. 26, 1940. R. L. BRIGGS 2,223,312
BRAZED JOINT AND METHOD OF PRODUCING THE SAME
Filed March 22, 1938 2 Sheets-Sheet 1
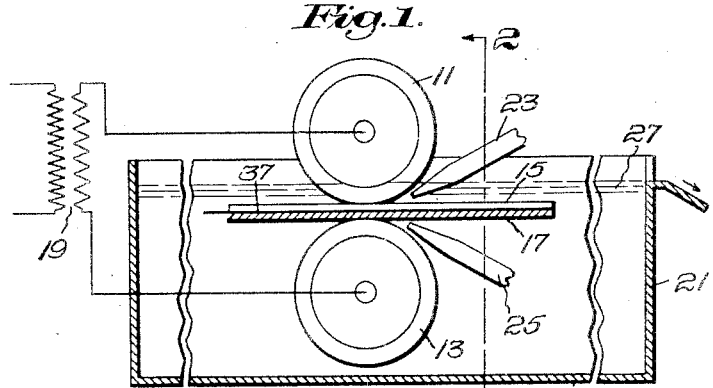
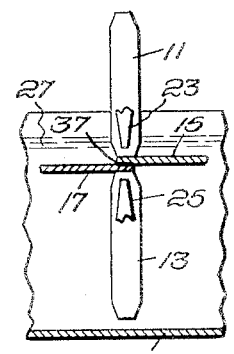
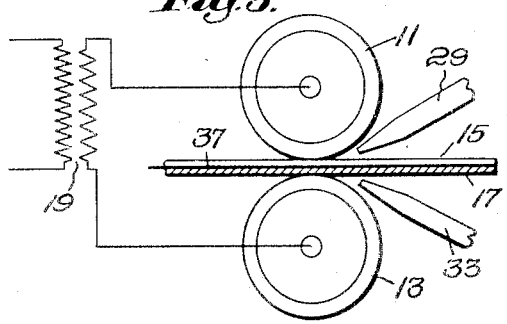
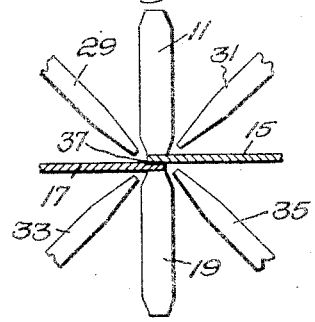
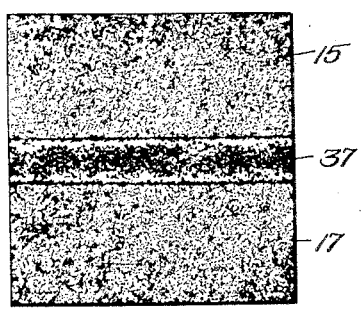
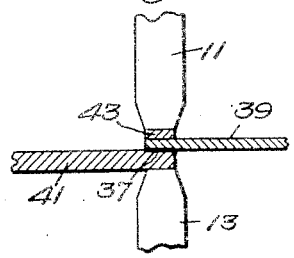
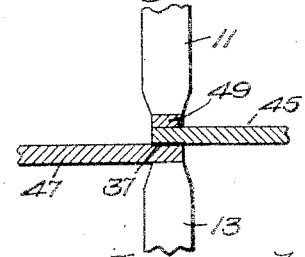
Inventor:
Rufus L. Briggs,
Attys.

Nov. 26, 1940.  R. L. BRIGGS  2,223,312
BRAZED JOINT AND METHOD OF PRODUCING THE SAME
Filed March 22, 1938   2 Sheets-Sheet 2
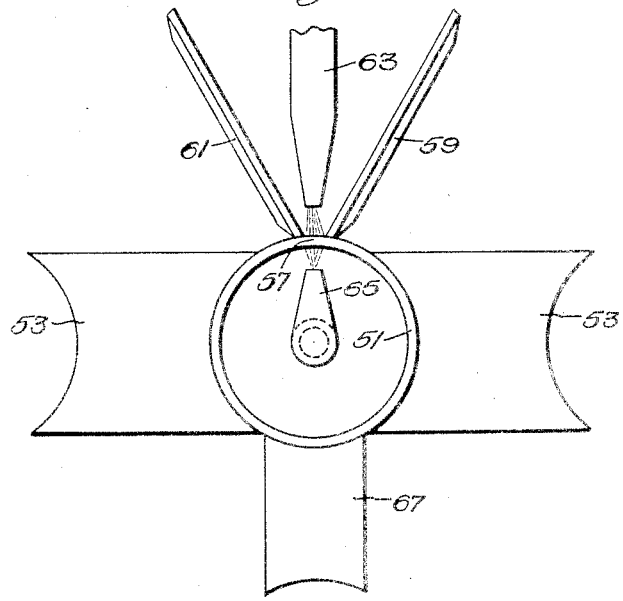
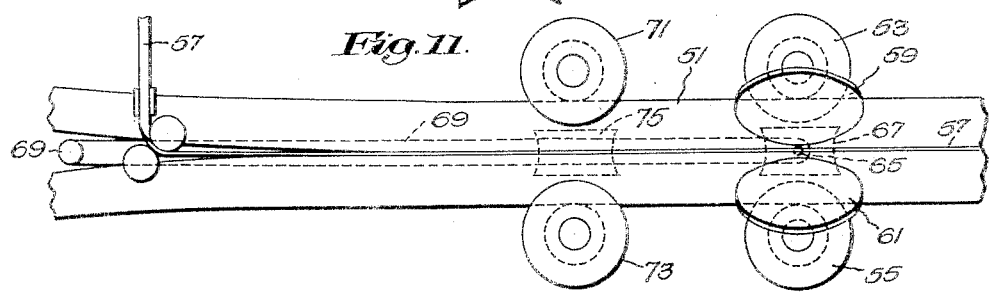
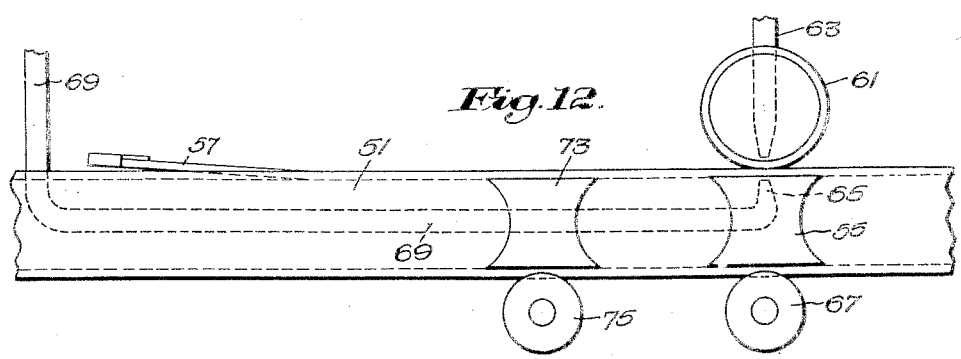
Inventor:
Rufus L. Briggs,
Attys Patented Nov. 26, 1940

2,223,312

UNITED STATES PATENT OFFICE 2,223,312

BRAZED JOINT AND METHOD OF PRODUCING THE SAME

Rufus L. Briggs, Melrose, Mass., assignor to Thomson-Gibb Electric Welding Company, Lynn, Mass., a corporation of Massachusetts, and Handy & Harman, Bridgeport, Conn., a corporation of New York, jointly Application March 22, 1938, Serial No. 197,403

13 Claims. (Cl. 219—12)

This invention relates to the joining of two metals, either through lapped or butt joints by hard soldering or brazing through means of electric resistance heating, in such manner that, without welding, a joint may be produced having a physical strength substantially equal to or greater than that of the metals joined and without substantial alteration of the grain structure of the metals so that the physical characteristics of the metals, and of the joint as a whole, are preserved substantially as they were before brazing.

This process, while applicable to the brazing of ferrous metals and alloys, is particularly, though not exclusively, applicable to non-ferrous metals such, for example, as copper and certain of its alloys which are dependent on cold working to obtain the highest physical values. Difficulties in welding metals are encountered where there is but slight separation between the plastic or welding temperatures of such metals and their "flow" or melting temperatures and arise largely from the practical difficulty of reaching and holding a welding temperature. These difficulties are relatively great for copper and alloys of high electrical conductivity where, to bring them to a plastic state, large current values are required difficult to control and difficult to utilize without detrimentally affecting the electrodes employed.

Such metals, however, may be readily brazed, either by the use of the blow torch or by electric resistance brazing, where a solder or brazing material is employed having a melting temperature substantially below the melting temperature of the metals to be joined.

In the brazing of such metals, however, as heretofore carried out another condition is encountered. These metals, as employed for useful industrial purposes, are usually in cold rolled form. This is characterized by a fine homogeneous grain structure, toughness, high tensile strength and density and low ductility. When heated above a certain temperature, however, and particularly when heated and then allowed to cool with an appreciable intervening time interval, these metals undergo a physical change. Under such a time-temperature condition, the grain structure of the metal changes, annealing of the metal takes place, and it becomes characterized by a large and irregular grain structure, softness, low tensile strength and high ductility.

This condition may be reached through the heating of the metal to a high temperature persisting for a short but appreciable interval or to lower temperatures persisting for a longer interval.

The temperature required to flow hard solder or brazing materials usually exceeds the range of temperatures which, if persisting for any appreciable interval, effects a change in the grain structure of the metal in the pieces being joined.

Where brazing has been performed by prior processes, either by the blow torch or by electric resistance means, in melting the solder or brazing material no satisfactory limiting control of this time-temperature factor has been found, that is to say, no adequate control of the temperature to which the metal parts are brought together with the time during which such temperature is allowed to persist.

The result has been that the grain structure of the metal at and about the brazed joint is coarsened and the brazed parts become more or less annealed, losing the characteristics imparted by the cold rolling, not only transversely across the joint section, by which is meant the metal immediately adjacent the surfaces joined, but for some distance from the joint section into the body of the metal. The metals of such a joint after brazing must therefore be re-worked by rolling, hammering or otherwise to restore, so far as possible, the original cold rolled condition of the material. This not only introduces an additional expensive step in the process of brazing but one difficult or impracticable in some cases to carry out and one which leaves the joint reduced in cross-sectional dimensions as compared with the joint as first brazed.

One object of the present invention is to preserve the proper relation between the temperature under which the soldering action takes place and the time during which the accompanying temperatures persist.

In carrying out one form of this process, current is applied progressively lengthwise the joint, and momentarily only as to successive cross sections, and in such a manner that the maximum resulting temperature, which is preferably sufficient only to flow the solder, is concentrated in the joint section, the metal on opposite sides of and away from the joint section being kept at a relatively lower temperature. This current is applied to successive cross sections simultaneously with mechanical pressure against the opposite metal faces and the temperature of the metal pieces at and about the joint is then immediately lowered by chilling to prevent any appreciable persistence of the temperatures employed either in the joint itself or in the metal adjacent the joint.

While particularly useful in its application to the hard soldering or brazing of non-ferrous metals, this process may be usefully applied to the brazing of ferrous metals or their alloys of such a character as, for example, nickel and chromium alloy steels and other stainless steels, particularly where the application of persisting heat detrimentally affects the metals themselves and deprives them of valuable characteristics which cannot be restored, or can only be restored with difficulty by reworking.

In carrying out the invention, we have found that hard solders or brazing alloys containing silver are the most satisfactory because of the lower melting points of this type as compared with base metal brazing alloys containing no silver. However, it is intended that this application shall include all solders, brazing materials and so-called spelters which have characteristics suitable for this purpose. In the practical application of this process, therefore, preference is given to solders of the type of the so-called hard silver silver solders, usually consisting of silver alloyed with a percentage of copper and with a certain amount of zinc or cadmium. Such solders may be had with flow temperatures ranging from 1200° to 1600° F., and are preferable to the commonly used brazing solders or spelters, or solders composed of copper, zinc, tin, manganese, etc., both on account of their ductility, their relatively low conductivity as compared with copper, and their low flow temperatures and the strength of the resulting joint when produced by the process herein described. The flow temperatures of these hard silver solders are approximately 300° to 400° less than the melting temperatures of copper, and are substantially less than the melting temperatures of such non-ferrous alloys as are commonly used for purposes where physical strength is required.

This solder is placed between the pieces of metal to be joined and is preferably in thin strip form of no greater mass than is required to separate the surfaces of the metal pieces and to fill in any minute voids therein when the solder is fused and the surfaces pressed together. While the metal pieces are pressed together a fusing current is then passed momentarily across a small transverse section of the joint and then progressively and quickly across succeeding sections. This action can readily be had, in the case of lapped joints for example, by causing relatively rapid travel of the lapped parts between roller electrodes, the latter exerting a suitable pressure against the opposite sides of the lap.

The current passed through the joint is so controlled in magnitude, its application is so timed, and the dissipation of heat from the joint section undergoing the brazing action is so provided for, that successive portions of the solder film crossing the line of the passage of the current are brought to its flow temperature and the adjacent contacting surfaces of the metal pieces to a temperature substantially comparable with the flow temperature of the solder, while the body of the metal as a whole, and away from the joint section, is kept at a relatively low temperature and below a temperature which in the brief interval of the current persistence can have any substantial effect on the grain structure of the melt. Furthermore, immediately upon the passage of the current through such section, the metal through which the current has been momentarily passed, including the thin layer of fused solder and the adjacent contacting surfaces of the metal pieces, is subjected to a chilling action, as by the application of a cooling medium, so that the temperature of the entire joint section is immediately lowered to or below the normal room temperature without the lapse of any appreciable time interval and without any appreciable coarsening of the grain structure beyond that produced at the minimum crystallization temperature.

In brazing as heretofore practised, apart from the annealing effect on the metal, the hardened solder between the metal pieces is characterized by more or less irregularity in thickness, lack of homogeneity, and by the presence of frequent voids. Through the application of the solder, such as in thin strip form, preapplied to the joint, subjecting it progressively to a fusing temperature while subjecting the pieces to be joined to a progressively advancing and uniform pressure forcing them together, a diffusion of the melted solder takes place over the entire joint, leaving the solder film when cooled and hardened in the form of a very thin, homogeneous film, of a thickness sufficient only to unite the metal pieces, and free from irregularities, voids or orifices.

The invention will be best understood by reference to the following description of one or more specific examples of its application, taken in connection with the accompanying drawings, while its scope will be more particularly pointed out in the appended claims.

In the drawings:

Fig. 1 shows diagrammatically, in side elevation, one means by which there may be carried out the hard soldering of lapped joints by the process herein described, including the electrode rollers in relation to the metal pieces to be joined and to the cooling medium for chilling the metal;

Fig. 2 is a cross-sectional elevation on the line 2—2 in Fig. 1;

Fig. 3 shows diagrammatically in side elevation another arrangement for the application of the cooling medium;

Fig. 4 is an end elevation showing the relation of the rollers, water jets and lapped metal pieces indicated in Fig. 3;

Fig. 5 is a partial cross-section through a portion of a copper joint brazed by the described method, as it appears on a greatly magnified scale from a photomicrograph;

Fig. 6 is a view, similar to Fig. 4, illustrating the method of centering the maximum heating effect on the solder in the case of metals of different thickness;

Fig. 7 is a similar view, showing the method of centering the heat on the solder in the case of metals of different thermal or electrical characteristics;

Figs. 8 and 9 illustrate other forms of lapped joints which may be brazed by the described process;

Fig. 10 shows diagrammatically in cross-sectional elevation means by which the same method may be applied to the hard soldering of butt joints, in this case the disunited edges of a tubular blank; and Figs. 11 and 12 show respectively in plan and elevation the manner in which the cooling medium and the solder strip are applied in the brazing of the tubular blank.

To carry out the herein described process, any suitable means may be employed for applying a uniform pressure to the metal pieces to be joined and simultaneously and progressively passing a current of electricity across successive small sections of the joint under such control as to effect the desired fusing of the hard solder. In the case of lapped joints, this may be conveniently and effectively accomplished by the use of electrode rollers (Figs. 1 and 2 and Figs 3 and 4) made of conductive metal and comprising the upper roller 11 and lower roller 13, between which the metal pieces 15 and 17 in lapped relation are caused to travel while the rollers are pressed toward each other under a constant and predetermined pressure. These rollers may be arranged, for example, as in the common type of seam welder (such, for example, as that disclosed in the patent to Gibb No. 1,965,312), so that the lower roller is vertically fixed and the upper roller 11 forced down against the lapped metal pieces under a preadjustable uniform pressure, one or both rollers being rotated at a preadjustable constant speed to insure the travel of the work between them at the rate desired for the particular pieces being brazed. These rollers constitute electrodes connected, by connections diagrammatically indicated, to opposite terminals of the low voltage secondary of a transformer 19, and the usual voltage and current control devices (not shown) are provided to control the heating effect of the current passing to the electrodes.

Various means may be employed to provide the chilling action heretofore referred to and to lower the temperature of the joint immediately after the passage of current therethrough. In Fig. 1 the lower roller 13, the lower part of the upper roller 11 and the parts of the metal pieces where they are to be brazed are kept immersed in a body of cooling medium, which is here a body of cooling water, maintained in the tank 21. A continuous supply of cold water is furnished by nozzles 23 and 25. The upper nozzle 23 is positioned to direct its discharge downwardly toward and close to the lower edge of the upper roller and against the surface of the metal piece 15, over and about its lapped edge where it emerges from between the rollers, so that there is maintained across this entire area an effective chilling condition due to the circulating and constantly renewed cold water. The lower nozzle 25 is positioned to direct its discharge upwardly toward and close to the edge of the lower roller 13, maintaining a similar chilling condition over the under side of the lapped edges. Water replaced by the cold discharge from the nozzles 23 and 25 is withdrawn through any suitable overflow 27. Connections for the lower roller 13 are made through a suitably packed joint (not shown) in the side of the tank.

The method of cooling illustrated in Figs. 1 and 2 has been found highly effective for the purpose herein described. As one alternative, and one usable in the brazing of joints for pieces which are not adapted for submergence in the liquid body of a tank, the method of chilling indicated in Figs. 3 and 4 may be employed, where the chilling medium in the form of cold water is sprayed on the work and allowed to drain therefrom. In this case there are preferably employed a pair of upper nozzles 29 and 31 and a similar pair of lower nozzles 33 and 35. The members 29 and 31 of the upper pair are located on opposite sides of the plane of the upper roller 11 but are directed both downwardly and inwardly so that their sprays tend to converge over the surface of the upper metal piece close to the point where it emerges from the rollers. The combined action of the two partly opposed sprays not only floods this area with cold water, but tends to maintain thereover a constantly renewed body of cold water of appreciable mass effectively chilling the metal at and about the brazed joint. The two lower nozzles 33 and 35 are on opposite sides of the plane of the lower roller 13 at a corresponding angle or inclination and maintain a chilling action at and about the lower part of the brazed joint.

A sufficiently copious supply of water and a sufficiently low temperature should be maintained from the nozzles to reduce immediately the temperature of the section emerging from the rollers below the temperature where any adverse change in grain structure can take place. The amount of water and its temperature will vary with the thickness and character of the metal pieces and the speed of travel between the rollers. Ordinarily, in the illustrated examples, water supplied at a temperature of from 45 to 50 degrees F. will suffice. For more rapid rates of travel or for metal pieces of greater mass, the volume of the water should preferably be increased or the temperature thereof lowered. While for ordinary purposes water provides an effective and practical chilling medium, chilling mediums of other forms and applied by other means may be employed.

The process may be illustrated by describing its application to the hard soldering of a lapped joint between two pieces of hard rolled copper brazed while submerged as in Fig. 1, each piece being $\frac{1}{16}$ of an inch in thickness and intended to have a joint $\frac{3}{8}$ of an inch across. The cross-section illustrated in Fig. 5 shows the resulting joint section as disclosed by a photomicrograph.

With the surfaces to be joined first cleaned, a thin strip 37 of hard solder, preferably though not necessarily flat, is laid on the surface of the lower sheet 17 along the line of the joint, the upper sheet 15 placed with its edge on the solder strip in lapped relation to the lower sheet 17, and the two lapped pieces inserted and caused to pass between the electrode rollers 11 and 13.

Preferably a hard silver solder is employed, the solder in the illustrative example comprising a self-fluxing solder composed of approximately 15% of silver, 80% of copper, and 5% of phosphorus and known by the trade-name of "Silfos," this having a melting temperature of approximately 1190° F. and a flow temperature of approximately 1300° F. This is prepared in the form of a thin strip, equal in width to at least the width of the intended joint and in the described example $\frac{3}{8}$ of an inch wide. An extreme thinness is desirable so as to quickly react to the heating effect of the current, the thickness required being only sufficient to provide the diffusion of the solder over the surfaces of the joint. The thickness of the solder strip in the described example is .003 of an inch.

The electrode rollers in the illustrative example are of copper 10 inches in diameter, with a face $\frac{7}{16}$ of an inch wide, to slightly overlap the width of the joint, although rollers might be used having a face somewhat narrower than the joint width. These are arranged to act against the lapped pieces under a total pressure of 500 pounds, both the pressure and the speed under which they are rotated being controlled by the operator. In the illustrative example, the rollers are driven at a speed to cause travel of the work between them at a rate of one foot per minute, while maintaining an uninterrupted current through the rollers and across the metal pieces of a magnitude of approximately 23,000 amperes.

The rollers may be of any suitable diameter, the larger the rollers the greater being the desirable dispersion of heat. The rollers may in turn be water cooled if desired, but ordinarily water contacting with the rollers in the arrangement of Figs. 1 and 2, or sprayed on the metal pieces and incidentally on the rollers themselves by the nozzles illustrated in Figs. 3 and 4, is sufficient to maintain them at the desired low temperature.

Generally speaking, the wider the joint or the more rapid the speed of travel, the greater is the roller pressure required. The wider the joint or the greater the speed of travel, or the greater the conductivity of the metal, or the greater the pressure used, the larger should be the magnitude of the heating current employed, the heating effect being the function of the square of the current, the electrical resistance of the metals across the joint and the time of application of the current to a given section.

These factors of speed, pressure and current, however, should be selected and controlled in relation to each other to secure in any given case the relationship which, as to any one cross section, will result in the briefest practicable interval in bringing the solder to the flow temperature, limiting the latter as closely as possible to approximately that temperature, and causing the complete dispersion of the solder over and across the surfaces pressed together, this action taking place rapidly and progressively over succeeding sections as the work travels between the rollers. The speed of travel of the work therefore should be as rapid as possible within the limits of current magnitude imposed by practical conditions, such as overheating the electrode rollers and the production of uniform results throughout the joint. The speed of travel may, therefore, be substantially increased by the use of precautions in the applications of the current, pressure and chilling action, and speeds greatly in excess of that mentioned in the illustrative example may be attained, although that speed greatly exceeds the speed attained in the ordinary torch methods of brazing.

The relationship of the factors referred to in the illustrative case in such as to concentrate the maximum but limited heating effect on the solder film to bring the solder to its flow temperature of approximately 1300° F., and the solder contacting faces of the copper to a substantially similar temperature. Owing to the dispersion of heat through the contact of the cold water with the surface of the metal pieces and the surfaces of the rollers, assisted by conduction through the rollers, the portions of metal at opposite sides of the joint between the electrodes and the solder contacting faces of the metal in any cross section through which the current is thus momentarily passed become heated only to temperatures which are lower than the flow temperature of the solder and below any temperature which, in the brief period of its persistence, can effect any appreciable coarsening of the granular structure of the metal beyond that produced at the minimum crystallization temperature, and these metal portions as well as those of the entire joint section, including the diffused solder and the solder contacting faces of the joint, are immediately chilled by the action of the cold water sprays as soon as such section emerges from the plane or zone through which the current has been momentarily passed.

While the use of self-fluxing solder is mentioned in the illustrative example, any suitable, separate, pre-applied flux may be used. Where precautions are taken previously to clean the surfaces of the pieces to be joined so that oxides and other surface impurities are removed, brazing may be carried out under this method with a fluxless solder, that is to say, without either a self-fluxing solder or a solder using a separate flux. A flux functions in part to offset surface oxidization induced by the brazing heat. Where the parts to be joined are flushed or covered with an adequate supply of water before reaching the rollers, the water acts both as a liquid protector preventing the surfaces from such access of air as can lead to oxidization, and as a cooling medium preventing them from reaching an oxidizing temperature at any position where the air might have access to them. Should a separate flux be desired, this method also permits its application to the surfaces to be joined by causing the water itself to carry a flux, such as borax, in solution.

In the illustrative example it is being assumed that an uninterrupted alternating current is employed. It is only required, however, to achieve a correct balance between heating and chilling and the time interval between these two conditions. Heating may be controlled by the magnitude of the heating current or by its periodic application. Accordingly this process may be carried out by current periodically interrupted for brief intervals, as, for instance, by an alternating current with one cycle "off" for each nine cycles "on," the number of "off" cycles furnishing a means of heat control.

The characteristics of the completely brazed joint as described in the illustrative example are shown by the joint section represented by the transverse cross-section in Fig. 5. It is there shown on a magnified scale, which is enlarged approximately one hundred times on the original patent drawings. Such cross-sectional view is obtained by making a smooth cut transversely across the joint, polishing the same, and then etching it with a solution of ammonia and hydrogen peroxide to develop the granular characteristics of the section.

The solder has been melted, diffused with substantial uniformity entirely across the joint, and presents itself as a hardened film free from voids or irregularities. The metal of the united pieces, as contrasted with the coarse grain structure produced by other methods of heating, has a small grain structure comparable to that produced at the minimum crystallization temperature. As contrasted with those joints brazed by prior processes, where the brazing has been followed by reworking to restore the cold rolled state, the metal of the pieces at the joint section is characterized by the substantial absence of slip lines or planes which are induced by cold rolling and also by an undiminished cross-section of the lapped pieces, so that the thickness of the component parts of the joint is the same as the thickness of the original metal and the same as that of the adjoining portions of the metal, instead of being thinner than the original metal and thinner than the adjoining metal portions, as in the case of brazed pieces subsequently reworked to restore the original cold rolled condition of the material.

The pieces brazed by this process and the joint as a whole, due to the briefly limited duration of the heating current through any given cross-section and the sudden chilling of the metal after the passage of the current, have physical characteristics which are comparable to those possessed by the metal prior to brazing, and a joint is provided which, in respect to physical strength, is at least equal or superior to that of the metals themselves and is superior to a joint produced by prior brazing processes where brazing is followed by reworking to restore the cold rolled condition with a subsequent reduction in the cross-section of the lapped pieces.

As another illustrative example, the use of the process may be instanced in the case of brazing metal pieces formed of an alloy consisting of 65% of copper and 35% of nickel, where the pieces are 1/16 of an inch in thickness and are to be brazed with a joint having a lap of 3/8 of an inch. In this case there may be employed a roller pressure of 350 pounds, a heating current of approximately 25,000 amperes, and a speed of travel of 2½ feet per minute, using a solder strip similar in form and thickness to that described in the previous example and of a width equal to that of the lap.

It is desirable to apply the heating current so that the point of maximum heat, corresponding as closely as possible to the flow temperature of the solder, is concentrated on the solder itself in the joint. In the brazing of lapped joints between metal pieces of the same composition but of materially different thickness, or, whether of the same or of different thicknesses, if they are of different thermal character, or of different electrical resistance, the point where the maximum heat occurs may coincide with a stratum of the metal lying on one side or the other of the joint so that that stratum must be heated above the flow temperature of the metal in order to reach that temperature at the solder.

Means may be provided under such circumstances to bring the point of maximum temperature in coincidence with the solder stratum. If, for example, as indicated in Fig. 6, two pieces 39 and 41 of similar composition, for example copper, but of different thicknesses are to be brazed, a strip 43 of copper may be laid over the top of the thinner piece 39 and carried thereon between the electrode rollers in the brazing operation, the thickness of the strip 43 being substantially equal to the difference between the thickness of the strips 39 and 41. This serves to bring the point of maximum heat, which would otherwise lie in the body of the thicker metal piece 41, into approximate coincidence with the solder layer 37.

Or if, for example, as indicated in Fig. 7, two pieces of metal 45 and 47 having different heat or electrical conductivity, such as the piece 45 of copper and the piece 47 of brass, are to be brazed, a strip 49 of metal may be laid on the top of the copper piece 45 and carried thereon between the rollers, the strip 49 being of such thickness and of such composition (for example, copper) to bring the point of maximum heat, otherwise lying within the body of the brass piece 47, into approximate coincidence with the solder layer 37.

This concentration of the point of maximum heat on the solder strip, while metals of dissimilar thickness or unlike electrical or thermal character are being dealt with, may be secured by other means qualified to differentially control the unlike temperatures resulting from the heating current in the two pieces. This differential control, for example, may be had by using electrodes of different thermal or electrical character, such that the roller pressing against the piece in which the maximum heating effect tends to center is relatively more effective in conducting heat from such piece than is the electrode roller pressing against the other piece.

For illustration, in the case of brazing copper to brass, the pieces being of equal thickness, for example 1/16 of an inch, there may be used a drop forged copper roller 10 inches in diameter having a face 3/8 of an inch pressing against the brass and another roller 10 inches in diameter with a 3/8 of an inch face pressing against the copper. The second roller, however, may be made of a copper cadmium alloy, similar in composition to the metal known in the art by the trade-name "Electroloy" or "Elkaloy." Or the water spray acting against the piece in which the maximum heating effect tends to center may be made more effective as by lowering its temperature or by increasing its volume, the main point being that the unequal heating in the two pieces is so modified by such a control as to bring the point of maximum heating in close approximation to the solder stratum.

While the process has been described in connection with the brazing of lapped joints of the type shown in Figs. 1 to 5 and 6 and 7, where the brazed marginal edges only of the two pieces overlap and the bodies of the pieces project on opposite sides of the lap, it is applicable to a wide variety of lapped joints. As illustrative of two of the many other forms of lapped joints to which the process is applicable, Fig. 8 shows two pieces 15 and 17 brazed along their marginal edges but projecting or overlying each other at the same side of the joint, while Fig. 9 shows one piece brazed to the other, the lapped joint occurring in an area on either or both pieces other than along its marginal edge.

The described process, in which two pieces of metal with the interposed thin strip of solder are pressed together and have a heating current simultaneously and momentarily passed across the joint progressively at successive small cross sections, may be applied to the butt brazing of two pieces as well as to lapped brazing.

While this has application to a wide variety of forms of butt joints and to substantially all metals, ferrous or non-ferrous, capable of being brazed, it has particularly advantageous application to the brazing of the disunited edges of a tubular blank for the production of tubing formed of copper or of alloys of high electrical conductivity which do not lend themselves readily to the welding process.

The described process may be applied to the production of tubes of various diameters and great length. One method of application is indicated more or less diagrammatically in Figs. 10, 11 and 12, where the disunited edges of a tubular blank 51 are butt brazed. In this case the blank 51 is caused to travel progressively between presser rolls 53 and 55 which press together the edges of the unjoined seam, between which there has been preapplied a film 57 of hard solder. Simultaneously there is passed across the joint, where the edges are thus pressed together, a heating current from the two electrode rollers 59 and 61 which contact with the blank close to and on opposite sides of the seam. To the outside of the blank at and adjacent the seam, and approximately where the rollers 59 and 61 contact with the blank, there is applied a spray of cold water from the nozzle 63. A similar spray of cold water is applied from within the blank to the walls thereof at and adjacent the bottom of the seam by the spray nozzle 65. The two water sprays act to immediately chill the section of the joint and the metal adjacent thereto, across which the heating current has been momentarily passed in the travel of the blank. A roller 67 engages the bottom of the blank to assist in maintaining it in the required relation to the other rollers.

The blank is caused to approach the position of brazing in a partly opened condition (as indicated at the left in Fig. 11), and the open gap in the top of the blank is entered by a water supply pipe 69 which extends through the interior of the blank and has connection to the upright nozzle 65. Immediately preceding the position of brazing, the partly open blank is engaged by forming or presser rolls 71 and 73 and the supporting roll 75, so that the tubular formation is completed at that point and the abutting edges forced together about the solder strip 57. The latter, having been gripped between the abutting edges when the blank is first started, is drawn from a supply roll (not shown) and caused to pass over suitable guide rolls into the gap between these slightly separated edges as the latter close and the blank travels between the rolls 71 and 73.

If desired, this method of brazing may be employed as a step in the formation of pipes or tubes where the tubular blank is formed from a flat strip of metal by forming rolls of the usual type, and in partly open position travels directly from such forming rolls to and through the brazing devices, such as herein described.

If desired, tubing of any given diameter brazed by the described process may thereafter be drawn by any of the well-known drawing methods to produce tubing of a reduced diameter.

By this method there may be carried out progressively the continuous brazing of tubes or pipes composed of copper or other metals of high conductivity, both of large and small diameters and of indefinite length.

The general principles underlying this process and the novel characteristics of the product produced thereby will be comprehended from the foregoing description and examples, it being understood that the specific numerical, dimensional and other data given in connection therewith are submitted for illustration only and not in any sense as limiting factors. The process, furthermore, has wide application to a great variety of metals, in a wide variety of shapes, forms and dimensions, and is not limited to any specific apparatus for carrying it into effect.

I claim:

1. The method of joining together by brazing two pieces of non-ferrous metal which are of a type depending on cold working to obtain the highest physical values which consists in interposing between pieces of cold-worked non-ferrous metal a hard solder having a melting temperature less than that of the metal of either of said pieces, pressing said metal pieces together, passing an electric heating current for a brief interval through a transverse section of the joint where said pressure is applied, so controlling the current and its time of application as to melt the solder without fusing the metal of said pieces, suddenly chilling the metal at said section immediately after the passage of the current therethrough, and so limiting the heat in the metal of said pieces resulting from said current and the persistence of such heat as to prevent any substantial coarsening of the grain structure beyond that produced at the minimum crystallization temperature.

2. The method of joining together by brazing two pieces of non-ferrous metal which are of a type depending on cold working to obtain the highest physical values, which consists in interposing between pieces of cold-worked non-ferrous metal a strip of hard solder having a melting temperature less than that of the metal of either of said pieces, progressively pressing said pieces together, simultaneously and progressively passing an electric heating current momentarily across successive cross-sections at the joint where said pressure is applied of such magnitude and duration as to provide a temperature in the solder of the order of its flow temperature, the effective application of current being sufficient to melt the solder only, and effecting a sudden chilling of the metal at each successive section immediately after the current has been passed therethrough, the interval allowed for the persistence of heat in the metal of said pieces resulting from said current being insufficient to produce any substantial coarsening of the grain structure beyond that produced at the minimum crystallization temperature.

3. The method of hard soldering two pieces of cold-worked cuprous metal together, which consists in interposing between such pieces a thin film of silver solder having a melting temperature less than that of either of said pieces, pressing the pieces together, simultaneously and momentarily passing an electrical heating current across the joint where said pressure is applied, so controlling the current and its time of application as to provide a temperature of the solder film of the order of the flow temperature of the solder and a comparable heating of the metal pieces only immediately adjacent the surfaces thereof contacting the solder without fusing the metal of said pieces, and effecting a sudden chilling of the metal at the joint section thus heated, the interval allowed for the persistence of heat in the metal of said pieces being insufficient to produce any coarsening of the grain structure of said pieces beyond that produced at the minimum crystallization temperature.

4. The method of joining together by brazing two pieces of non-ferrous metal which are of a type depending on cold working to obtain the highest physical values, which consists in interposing between pieces of cold-worked non-ferrous metal a hard solder having a melting temperature less than that of the metal of either of said pieces, pressing said metal pieces together, passing momentarily through a transverse section of the joint where said pressure is applied a relatively high, periodically interrupted, electrical heating current, the current being of such magnitude, period of interruption and persistence for any given section as to provide a temperature sufficient to melt the solder only, and suddenly chilling the metal at said section immediately after the passage of the current therethrough, the interval allowed for the persistence of heat in the metal of said pieces resulting from said current being insufficient to produce any substantial coarsening of the grain structure beyond that produced at the minimum crystallization temperature.

5. The method of hard soldering two pieces of metal, the physical properties of which are deleteriously affected by heat and the persistence of heat, which consists in interposing between said pieces a hard solder having a melting temperature less than that of the metal of either of said pieces, pressing said pieces together, passing an electric heating current momentarily across a transverse section of the joint where said pressure is applied, so controlling the current and the time of its application as to melt the solder without fusing the metal of said pieces, submerging the joint in a cooling medium to effect a sudden chilling of the metal at and about the joint section immediately after the passage of the current therethrough, and so limiting the heat in the metal of said pieces resulting from the current and the persistence of such heat as to prevent any substantial deleterious effect of the heat in the metal of said pieces.

6. The method of hard soldering along a lapped joint two pieces of metal, the physical properties of which are deleteriously affected by heat and the persistence of heat, which consists in arranging the pieces in lapped relation, preapplying between the areas to be joined a thin strip of hard solder of a width substantially equal to that of the joint and having a melting temperature substantially less than that of the metal of said pieces, progressively pressing together the successive lapped portions of the pieces by rolling pressure, passing an electric heating current momentarily across successive transverse sections of the joint simultaneously with the pressure created thereat, controlling the effect of the heating current to provide a temperature sufficient for melting the solder only, and, immediately following the passage of the heating current through each successive section and the application of the pressure thereto, abruptly chilling the metal at and about the joint by the application of a chilling medium and so limiting the heat in the metal of said pieces resulting from the current and the persistence of such heat as to prevent any substantial deleterious effect of the heat in the metal of said pieces.

7. The method of butt brazing pieces of cold-worked non-ferrous metal of a type depending on cold working to obtain the highest physical values, which consists in pressing together the abutting edges of the pieces with an interposed strip of brazing material having a flow temperature less than that of the melting temperature of either metal piece, passing through successive transverse sections of the abutting edges where said pressure is applied a relatively high electric current for a brief interval, the effective application of the current being sufficient to melt the solder only, applying a chilling medium to both opposite sides of the brazed joint immediately after the passage of the heating current through successive sections, and so limiting the heat in the metal of said pieces resulting from said current and the persistence of such heat as to prevent any substantial coarsening of the grain structure beyond that produced at the minimum crystallization temperature.

8. The method of butt brazing the disunited edges of a seamed tubular blank of cold-worked non-ferrous metal of a type depending on cold working to obtain the highest physical values, which consists in progressively pressing together the said edges and closing them about a preapplied strip of hard solder, passing an electric heating current momentarily across the joint at successive transverse sections of the joint while the edges are pressed together, controlling the heating effect of the current to provide a temperature sufficient to melt the solder only, applying a chilling medium both exteriorly and interiorly of the tubular blank at both opposite edges of the brazed seam for each successive section abruptly after the passage of the heating current, and so limiting the heat in the metal of said blank resulting from said current and the persistence of such heat as to prevent any substantial coarsening of the grain structure beyond that produced at the minimum crystallization temperature.

9. The method of carrying out the progressive, continuous brazing of the disunited edges of seamed tubular blanks of relatively great length and composed of cold-worked non-ferrous metal, which consists in progressively applying to said edges a hard solder, thereafter pressing and closing said edges against each other, causing the momentary passage of heating current progressively across successive transverse sections of the joint where said pressure is applied, so controlling the heating effect of the current as to heat the solder only, suddenly chilling the metal at each section of the joint after the passage of the current therethrough, and so limiting the heat in the metal of said blanks resulting from said current and the persistence of such heat as to prevent any substantial coarsening of the grain structure beyond that produced at the minimum crystallization temperature.

10. The method of brazing by hard soldering, which consists in cleaning the surfaces of two pieces of non-ferrous metal, interposing between said surfaces a hard solder having a melting temperature less than that of either of the two pieces, pressing said pieces together, passing an electric heating current for a brief interval through a transverse section of the joint where the pressure is applied, so controlling the current as to melt the solder only, applying to the surface to be brazed a cooling flux-carrying liquid, and applying said liquid to the said section immediately after the passage of the current therethrough to suddenly chill the metal at said section.

11. A joint structure formed from cold-worked non-ferrous metal of a type depending on cold working to obtain the highest physical values, having a brazed joint with an interposed thin film of hard solder diffused over the joint in substantially uniform thickness and free from voids and irregularities, the metal at the joint section being characterized by a fine grain structure with the absence of slip planes.

12. A joint structure formed from cold-worked non-ferrous metal of a type depending on cold working to obtain the highest physical values, having a brazed joint with an interposed film of hard solder diffused over the joint in substantially uniform thickness and free from voids and irregularities, the metal of the structure up to the joint section being characterized by its original cold worked condition, the metal at the joint section being characterized by a fine grain structure, and the joint structure being characterized by a thickness undiminished through reworking.

13. The method of joining together by brazing two pieces of metal the physical properties of which are deleteriously affected by heat and the persistence of heat, which consists in interposing between said pieces a hard solder having a melting temperature less than that of the metal of either of said pieces, pressing said metal pieces together, passing an electric heating current for a brief interval through a transverse section of the joint where said pressure is applied, so controlling the current and its time of application as to melt the solder without fusing the metal of said pieces, suddenly chilling the metal at said section immediately after the passage of the current therethrough, and so limiting the heat in the metal of said pieces resulting from the current and the persistence of such heat as to prevent any substantial deleterious effect of the heat in the metal of said pieces.

RUFUS L. BRIGGS.